US00RE43687E

(19) United States
(12) Reissued Patent
Ohtani

(10) Patent Number: US RE43,687 E
(45) Date of Reissued Patent: Sep. 25, 2012

(54) IMAGE FORMING METHOD AND SYSTEM WITH A FINISHING CAPABILITY

(75) Inventor: Masaki Ohtani, Kanagawa (JP)

(73) Assignee: Ricoh Company, Ltd., Tokyo (JP)

(21) Appl. No.: 11/241,900

(22) Filed: Oct. 3, 2005

Related U.S. Patent Documents

Reissue of:

(64) Patent No.: 6,799,006
Issued: Sep. 28, 2004
Appl. No.: 10/728,980
Filed: Dec. 8, 2003

U.S. Applications:

(63) Continuation of application No. 10/013,685, filed on Dec. 13, 2001, now Pat. No. 6,711,365.

(30) Foreign Application Priority Data

| | | |
|---|---|---|
| Dec. 14, 2000 | (JP) | 2000-380541 |
| Jan. 12, 2001 | (JP) | 2001-004551 |
| Dec. 6, 2001 | (JP) | 2001-372661 |
| Dec. 6, 2001 | (JP) | 2001-372670 |

(51) Int. Cl.
*G03G 15/00* (2006.01)

(52) U.S. Cl. ..... 399/82; 399/410

(58) Field of Classification Search ..... 399/82, 399/407, 410, 81, 389, 391
See application file for complete search history.

(56) References Cited

U.S. PATENT DOCUMENTS

| | | | | |
|---|---|---|---|---|
| 5,999,767 | A * | 12/1999 | Ando | 399/85 |
| 6,088,568 | A * | 7/2000 | Ohtani | 399/408 |
| 6,091,929 | A * | 7/2000 | Yamazaki et al. | 399/410 |
| 6,144,818 | A * | 11/2000 | Ohtani | 399/81 |
| 6,188,868 | B1 * | 2/2001 | Shiramura | 399/410 |
| 6,215,977 | B1 * | 4/2001 | Otani | 399/407 |
| 6,427,997 | B1 * | 8/2002 | Hirota et al. | 270/58.12 |
| 6,430,389 | B1 * | 8/2002 | Kimura | 399/410 |

FOREIGN PATENT DOCUMENTS

| | | | |
|---|---|---|---|
| JP | 06008548 | A * | 1/1994 |
| JP | 07288675 | A * | 10/1995 |
| JP | 2000-016684 | | 1/2000 |
| JP | 2000016684 | A * | 1/2000 |

* cited by examiner

*Primary Examiner* — Robert Beatty
(74) *Attorney, Agent, or Firm* — Oblon, Spivak, McClelland, Maier & Neustadt, L.L.P.

(57) ABSTRACT

An image forming system of the present invention includes an image forming method and section for forming an image on a sheet fed thereto. A stapler included in a finisher staples a stack of sheets each carrying image formed by the image forming section thereon. A controller causes the image forming section to form an image in accordance with input image data and causes the stapler to staple the stack of sheets at a preselected point or points. When sheets of different sizes are mixed together, the controller inhibits the stapler from stapling the stack except when the short edges of a large size sheet and the long edges of a small size sheet are identical in length in a direction perpendicular to the direction of sheet feed and when all the images printed on the sheets have the same orientation when the stapled stack is spread.

56 Claims, 16 Drawing Sheets

Fig. 5

Portrait/Short Edge Feed

217a

| SHEET SIZE ON TRAY \ PATTERN | | H1 TOP LEFT OBLIQUE | A1 TOP RIGHT OBLIQUE | I1 LEFT TWO POINTS | B1 TOP TWO POINTS | J1 RIGHT TWO POINTS | C1 TOP LEFT HOR. | D1 TOP RIGHT HOR. |
|---|---|---|---|---|---|---|---|---|
| A3R, B4R | SIMPLEX | CANCEL | 180 | CANCEL | 180 | CANCEL | 180 | 180 |
| DLR, LGR | DUPLEX TOP | CANCEL | 180 | DUPLEX CANCEL | 180 | DUPLEX CANCEL | 180 | 180 |
| A4R, B5R | DUPLEX LEFT | CANCEL | DUPLEX CANCEL | CANCEL | DUPLEX CANCEL | DUPLEX CANCEL | 180 | DUPLEX CANCEL |
| LTR, EXR | DUPLEX RIGHT | DUPLEX CANCEL | 180 | DUPLEX CANCEL | DUPLEX CANCEL | CANCEL | DUPLEX CANCEL | 180 |
| OTHERS | | CANCEL | | | | | | |
| STAPLE PARAMETER | | 0 | 12 | 2 | 14 | 10 | 15 | 13 |

Fig. 6

Landscape/Short Edge Feed

217b

| SHEET SIZE ON TRAY \ PATTERN | | E1 TOP LEFT OBLIQUE | K1 TOP RIGHT OBLIQUE | F1 LEFT TWO POINTS | L1 TOP TWO POINTS | RIGHT TWO POINTS | G1 TOP LEFT VER. | TOP RIGHT VER. |
|---|---|---|---|---|---|---|---|---|
| A3R, B4R | SIMPLEX | 0 | CANCEL | 0 | CANCEL | 180 | 0 | 180 |
| DLR, LGR | DUPLEX TOP | 0 | CANCEL | DUPLEX CANCEL | CANCEL | DUPLEX CANCEL | 0 | 180 |
| A4R, B5R | DUPLEX LEFT | 0 | DUPLEX CANCEL | 0 | DUPLEX CANCEL | DUPLEX CANCEL | 0 | DUPLEX CANCEL |
| LTR, EXR | DUPLEX RIGHT | DUPLEX CANCEL | CANCEL | DUPLEX CANCEL | DUPLEX CANCEL | 180 | DUPLEX CANCEL | 180 |
| OTHERS | | CANCEL | | | | | | |
| STAPLE PARAMETER | | 0 | 12 | 2 | 14 | 10 | 1 | 11 |

Fig. 7

217c

Portrait/Long Edge Feed

| PATTERN / SHEET SIZE ON TRAY | | E2 | K2 | F2 | L2 | | G2 | |
|---|---|---|---|---|---|---|---|---|
| | | TOP LEFT OBLIQUE | TOP RIGHT OBLIQUE | LEFT TWO POINTS | TOP TWO POINTS | RIGHT TWO POINTS | TOP LEFT VER. | TOP RIGHT VER. |
| A3, B4, DL, LG | | 0 | CANCEL | 0 | CANCEL | 180 | 0 | 180 |
| A4, B5 LT, EX | DUPLEX SIMPLEX | 0 | CANCEL | DUPLEX CANCEL | CANCEL | DUPLEX CANCEL | 0 | 180 |
| | DUPLEX TOP | 0 | DUPLEX CANCEL | 0 | DUPLEX CANCEL | DUPLEX CANCEL | 0 | DUPLEX CANCEL |
| | DUPLEX LEFT | DUPLEX CANCEL | CANCEL | DUPLEX CANCEL | DUPLEX CANCEL | 180 | DUPLEX CANCEL | 180 |
| | DUPLEX RIGHT | | | | | | | |
| OTHERS | | CANCEL | | | | | | |
| STAPLE PARAMETER | | 0 | 12 | 2 | 14 | 10 | 1 | 11 |

Fig. 8

217d

Landscape/Long Edge Feed

| PATTERN / SHEET SIZE ON TRAY | | H2 | A2 | I2 | B2 | J2 | C2 | D2 |
|---|---|---|---|---|---|---|---|---|
| | | ABC TOP LEFT OBLIQUE | ABC TOP RIGHT OBLIQUE | ABC LEFT TWO POINTS | ABC TOP TWO POINTS | ABC TOP RIGHT POINTS | ABC TOP LEFT HOR. | ABC TOP RIGHT HOR. |
| A3, B4, DL, LG | | | | | | | | |
| A4, B5 LT, EX | SIMPLEX | CANCEL | 180 | CANCEL | 180 | CANCEL | 180 | 180 |
| | DUPLEX TOP | CANCEL | 180 | DUPLEX CANCEL | 180 | DUPLEX CANCEL | 180 | 180 |
| | DUPLEX LEFT | CANCEL | DUPLEX CANCEL | CANCEL | DUPLEX CANCEL | DUPLEX CANCEL | 180 | DUPLEX CANCEL |
| | DUPLEX RIGHT | DUPLEX CANCEL | 180 | DUPLEX CANCEL | DUPLEX CANCEL | CANCEL | DUPLEX CANCEL | 180 |
| OTHERS | | CANCEL | | | | | | |
| STAPLE PARAMETER | | 0 | 12 | 2 | 14 | 10 | 15 | 13 |

Fig. 14A

| PATTERN / SHEET SIZE ON TRAY | | TOP LEFT OBLIQUE | TOP RIGHT OBLIQUE | LEFT TWO POINTS | TOP TWO POINTS | RIGHT TWO POINTS | TOP LEFT HOR. | TOP RIGHT HOR. |
|---|---|---|---|---|---|---|---|---|
| A3R, B4R | SIMPLEX | CANCEL | 180 | CANCEL | 180 | CANCEL | 180 | 180 |
| DLR, LGR | DUPLEX TOP | CANCEL | 180 | DUPLEX CANCEL | 180 | DUPLEX CANCEL | 180 | 180 |
| A4R, B5R | DUPLEX LEFT | CANCEL | DUPLEX CANCEL | CANCEL | DUPLEX CANCEL | DUPLEX CANCEL | 180 | DUPLEX CANCEL |
| LTR, EXR | DUPLEX RIGHT | DUPLEX CANCEL | 180 | DUPLEX CANCEL | DUPLEX CANCEL | CANCEL | DUPLEX CANCEL | 180 |
| OTHERS | | | | | CANCEL | | | |
| STAPLE PARAMETER | | 0 | 12 | 2 | 14 | 10 | 15 | 13 |

Fig. 14B

| PATTERN / SHEET SIZE ON TRAY | | TOP LEFT OBLIQUE | TOP RIGHT OBLIQUE | LEFT TWO POINTS | TOP TWO POINTS | RIGHT TWO POINTS | TOP LEFT VER. | TOP RIGHT VER. |
|---|---|---|---|---|---|---|---|---|
| A3, B4, DL, LG | | | | | | | | |
| A4, B5, LT, EX | SIMPLEX | 0 | CANCEL | 0 | CANCEL | 180 | 0 | 180 |
| | DUPLEX TOP | 0 | CANCEL | DUPLEX CANCEL | CANCEL | DUPLEX CANCEL | 0 | 180 |
| | DUPLEX LEFT | 0 | DUPLEX CANCEL | 0 | DUPLEX CANCEL | DUPLEX CANCEL | 0 | DUPLEX CANCEL |
| | DUPLEX RIGHT | DUPLEX CANCEL | CANCEL | DUPLEX CANCEL | DUPLEX CANCEL | 180 | DUPLEX CANCEL | 180 |
| OTHERS | | | | | CANCEL | | | |
| STAPLE PARAMETER | | 0 | 12 | 2 | 14 | 10 | 1 | 11 |

Fig. 15A

| SHEET SIZE ON TRAY \ PATTERN | | TOP LEFT OBLIQUE | TOP RIGHT OBLIQUE | LEFT TWO POINTS | TOP TWO POINTS | RIGHT TWO POINTS | TOP LEFT HOR. | TOP RIGHT HOR. |
|---|---|---|---|---|---|---|---|---|
| A3, B4, DL, LG | | | | | | | | |
| A4, B5, LT, EX | SIMPLEX | CANCEL | 180 | CANCEL | 180 | CANCEL | 180 | 180 |
| | DUPLEX TOP | CANCEL | 180 | DUPLEX CANCEL | 180 | DUPLEX CANCEL | 180 | 180 |
| | DUPLEX LEFT | CANCEL | DUPLEX CANCEL | CANCEL | DUPLEX CANCEL | DUPLEX CANCEL | 180 | DUPLEX CANCEL |
| | DUPLEX RIGHT | DUPLEX CANCEL | 180 | DUPLEX CANCEL | DUPLEX CANCEL | CACEL | DUPLEX CANCEL | 180 |
| OTHERS | | CANCEL | | | | | | |
| STAPLE PARAMETER | | 0 | 12 | 2 | 14 | 10 | 15 | 13 |

Fig. 15B

| SHEET SIZE ON TRAY \ PATTERN | | TOP LEFT OBLIQUE | TOP RIGHT OBLIQUE | LEFT TWO POINTS | TOP TWO POINTS | RIGHT TWO POINTS | TOP LEFT VER. | TOP RIGHT VER. |
|---|---|---|---|---|---|---|---|---|
| A3R, B4R | SIMPLEX | 0 | CANCEL | 0 | 180 | 180 | 0 | 180 |
| DLR, LGR A4R, B5R LTR, EXR | DUPLEX TOP | 0 | CANCEL | DUPLEX CANCEL | DUPLEX CANCEL | DUPLEX CANCEL | 0 | 180 |
| | DUPLEX LEFT | 0 | DUPLEX CANCEL | 0 | DUPLEX CANCEL | DUPLEX CANCEL | 0 | DUPLEX CANCEL |
| | DUPLEX RIGHT | DUPLEX CANCEL | CANCEL | DUPLEX CANCEL | 180 | 180 | DUPLEX CANCEL | 180 |
| OTHERS | | | | | CANCEL | | | |
| STAPLE PARAMETER | | 0 | 12 | 2 | 14 | 10 | 1 | 11 |

IMAGE FORMING METHOD AND SYSTEM WITH A FINISHING CAPABILITY

Matter enclosed in heavy brackets [ ] appears in the original patent but forms no part of this reissue specification; matter printed in italics indicates the additions made by reissue.

This is a continuation of prior application Ser. No. 10/013,685, filed Dec. 13, 2001, now U.S. Pat. No. 6,711,365.

BACKGROUND OF THE INVENTION

1. Field of the Invention

The present invention relates to a printer, copier, facsimile apparatus, a multifunction machine or similar image forming apparatus. More particularly, the present invention relates to an image forming system having various finishing functions including a stapling function, a punching function, and a sorting function.

2. Description of the Background Art

It is a common practice with a printer connected to a host to print a document prepared on the host. In this case, the operator of the host usually gives little consideration to the sizes or the positions of sheets stacked on the trays of the printer. This is contrastive to the case wherein a person directly operates a copier to copy a document. Further, when a plurality of hosts share a single printer via a network, the printer is rarely near at hand for a person desiring to use the printer. The person therefore gives least consideration to the conditions of sheets stored in the printer. Moreover, there is an increasing demand for more advanced paper handling practicable by stacking various kinds of sheets on the trays and storing the characteristics of the sheets in the printer.

Today, a multifunction machine capable not only of printing out data received from a host but also copying a document is extensively used. Furthermore; finishing functions of recent years and selection thereof are extremely sophisticated. For example, the selection of an operation mode available with a finisher selectively mounted to a machine is becoming sophisticated. In addition, a plurality of different finishers are sometimes connected to a single machine.

Japanese Patent Laid-Open Publication No. 9-261415, for example, discloses an image forming apparatus capable of stapling a stack of prints at the top, bottom, right or left of the stack at one or two points or at one corner or punching the sheets. It has been customary with an image forming apparatus to identify the orientation of a text image to be copied and then execute adequate rotation to thereby staple a stack of prints in the same direction.

Assume that the operator of a printer with a finisher having a stapling function and a punching function selects, e.g., the stapling function. Then, the printer staples a sheet stack as designed by the operator and therefore sometimes staples it in an unexpected direction. Further, assume that the operator starts up an application for causing the printer to print a desired document while selecting, e.g., the stapling function and then cause it to print another document with the same application without changing the setting of a driver. Then, the finisher is apt to staple a sheet stack in an unexpected manner in accordance with the previous setting. Moreover, when the stapler staples a stack of sheets of different sizes, images on the stapled sheets would be different in direction from each other and therefore difficult to see if adequate control were not executed.

Technologies relating to the present invention are also disclosed in, e.g., Japanese Patent Laid-Open Publication Nos. 2000-16684 and 2001-26357.

SUMMARY OF THE INVENTION

It is an object of the present invention to provide an image forming system capable of executing stapling, punching, sorting or similar finishing faithful to the operator's intention.

It is another object of the present invention to provide an image forming system capable of adequately stapling a sheet stack matching with the sizes of sheets, printing direction, and designated stapling position.

In accordance with the present invention, an image forming system includes an image forming section for forming an image on a sheet fed thereto. A stapler included in a finisher staples a stack of sheets each carrying image formed by the image forming section thereon. A controller causes the image forming section to form an image in accordance with input image data and causes the stapler to staple the stack of sheets at a preselected point or points. When sheets of different sizes are mixed together, the controller inhibits the stapler from stapling the stack except when the short edges of a large size sheet and the long edges of a small size sheet are identical in length in a direction perpendicular to the direction of sheet feed and when all the images printed on the sheets have the same orientation when the stapled stack is spread.

Also, in accordance with the present invention, an image forming apparatus includes an image forming section for forming an image on a sheet in accordance with image data and print conditions input thereto. A sheet feed section feeds a sheet to the image forming section. The sheet feed section includes a plurality of trays each being loaded with a stack of sheets of a particular size in a short edge feed position in which the long edges of the sheets are parallel to the direction of sheet feed or a long edge feed position in which they are perpendicular to the above direction. A sheet discharge section sequentially discharges the sheets sequentially coming out of the image forming section. A stapler staples the sheets stacked thereon. A controller controls the image forming section, sheet feed section, sheet discharge section, and stapler. The controller selects any one of the trays in accordance with, among the print conditions, the stapling position of the stack and the direction of image formation on the sheets.

BRIEF DESCRIPTION OF THE DRAWINGS

The above and other objects, features and advantages of the present invention will become more apparent from the following detailed description taken with the accompanying drawings in which:

FIG. 5 is a table listing first combinations used to determine whether or not stapling is practicable;

FIG. 6 is a table listing second combinations used to determine whether or not stapling is practicable;

FIG. 7 is a table listing third combinations used to determine whether or not stapling is practicable;

FIG. 8 is a table listing fourth combinations used to determine whether or not stapling is practicable;

FIGS. 14A, 14B, 15A and 15B are tables each listing particular staple patterns available with the alternative embodiment.

DESCRIPTION OF THE PREFERRED EMBODIMENTS

Figure 1:
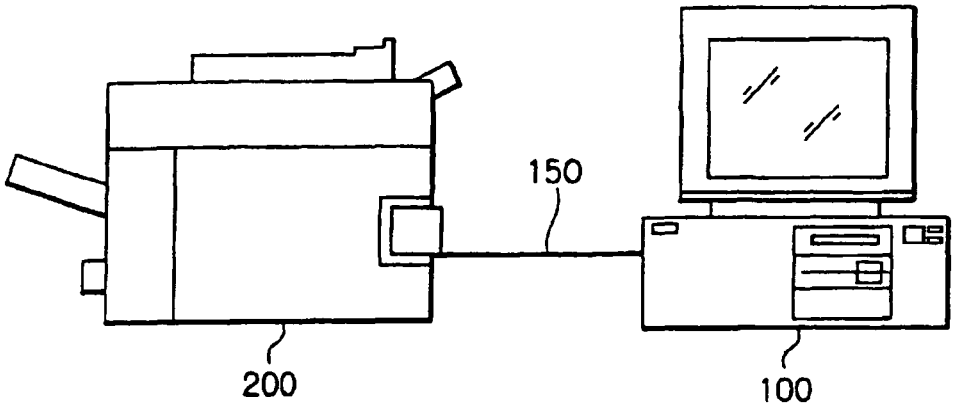
FIG. 1 is a schematic block diagram showing an image forming system embodying the present invention.

Referring to FIG. 1 of the drawings, an image forming system embodying the present invention is shown and generally made up of a host (host computer hereinafter) 100 and a printer 200. In the illustrative embodiment, conventional communication means 150 connects the host computer 100 and printer 200 to each other. Of course, a plurality of host computers may share the printer 200 via a network. A finisher or sheet processing device, not shown, is associated with the printer 200.

Figure 2:
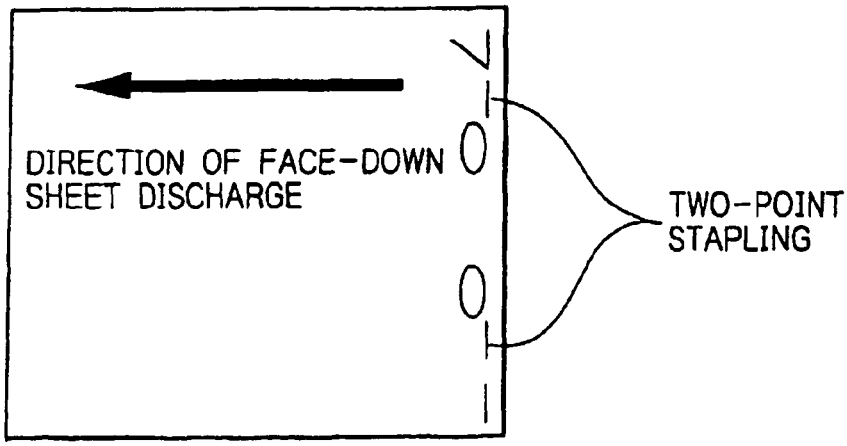
FIG. 2 shows a relation between a sheet and a stapling position and a punching position.

FIG. 2 shows a sheet driven out of the printer 200 face down, i.e., with an image surface facing downward in a direction indicated by an arrow. As shown, the finisher mentioned above is capable of selectively stapling the trailing edge portion of the sheet in a rear oblique position, a rear vertical position, front position or two positions, as desired. It is to be noted that the terms "rear" and "front" are used with respect to the direction as seen from the front side of the sheet. A stapler 225 or a puncher 226, which will be described later with reference to FIG. 3, respectively staples or punches the sheet.

Figure 3:
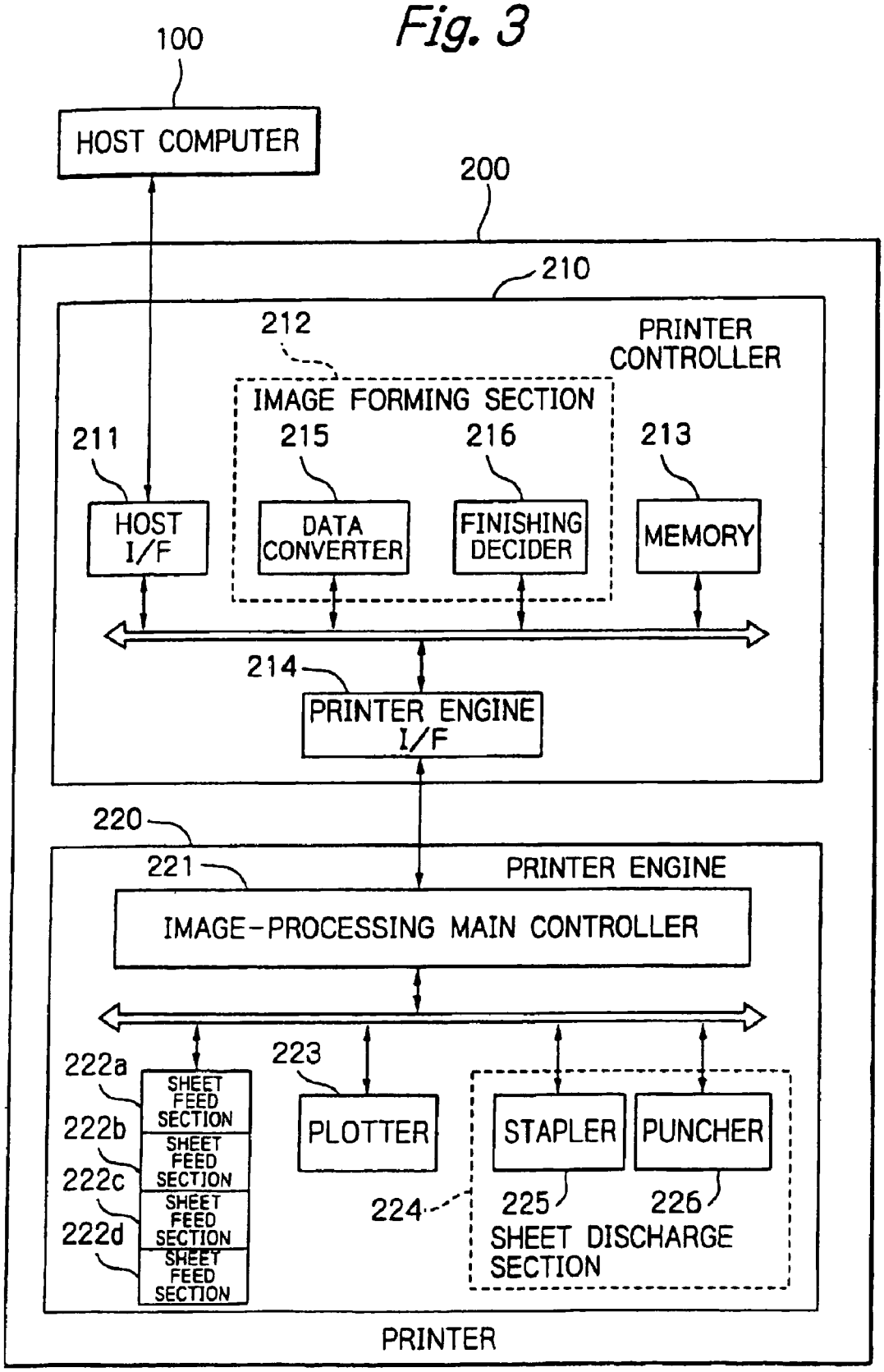
FIG. 3 is a schematic block diagram showing a control system included in the illustrative embodiment.

As shown in FIG. 3 in detail, the printer 200 includes a printer controller 210 and a printer engine 220. The printer controller 210 includes a host interface (I/F) 211 connected to the host computer 100, an image generating section 212, a memory 213, and a printer engine I/F 214. The host I/F 211 receives print data and commands from the host computer 100. The image generating section 212 includes a data converter 215 and a finishing decider 216. The data converter 215 analyzes print data received from the host computer 100 and converts them to image data. The finishing decider 216 analyzes a command received from the host computer 100 to see if it is indicative of the combination of a staple mode or a punch mode and a rotation sort mode. The finishing decider 216 then determines whether or not stapling is practicable and whether or not 180° rotation is necessary. The finishing decider 216 outputs a staple command or a punch command and a 180° rotation command in accordance with the result of the above decision.

The memory 213 stores various combinations indicative of whether or not stapling or punching can be adequately executed for various stapling patterns and punching patterns. The printer engine I/F 214 sends the image data to the image forming section 220 while interchanging various commands and information with the image forming section 220.

The image forming section 220 includes a image-processing main controller 21, a plurality of sheet feed sections 222a through 222d, a plotter 223, and a sheet discharge section 224. In response to a command received from the printer controller 210, the image-processing main controller 21 controls the image forming operation of the plotter 223, sheet feed from the sheet feed sections 222a through 222d, and sheet discharge at the sheet discharge section 224. The sheet feed sections 222a and 222b, for example, allow sheets of size A4 or below to be stacked in a short edge feed position or a long edge feed position, respectively. The short edge feed position and long edge feed position respectively refer to a position in which the short edges of a sheet are perpendicular to a direction of sheet feed and a position in which the long edges of the same are perpendicular to the above direction.

The plotter 223 is operable in a rotation sort mode for alternately forming images on a set (copy) of sheets positioned in the long edge feed position and a set (copy) of sheets positioned in the short edge feed position by switching orientation. Such consecutive sets of sheets are of the same size, e.g., size A4. The plotter 223 prints out the image data received from the printer controller 210 on sheets sequentially fed from the sheet feed sections 222a through 222d. The sheet discharge section 224 includes the stapler 225 and puncher 226 mentioned earlier. The stapler 225 staples a stack of sheets or prints conveyed thereto from the plotter 223 at one or two points of the stack. The puncher 224 punches the tailing edge portion the sheets. The sheet discharge section 224 may be constructed into a finisher unit and operatively connected to the printer 200, if desired.

Figure 4:
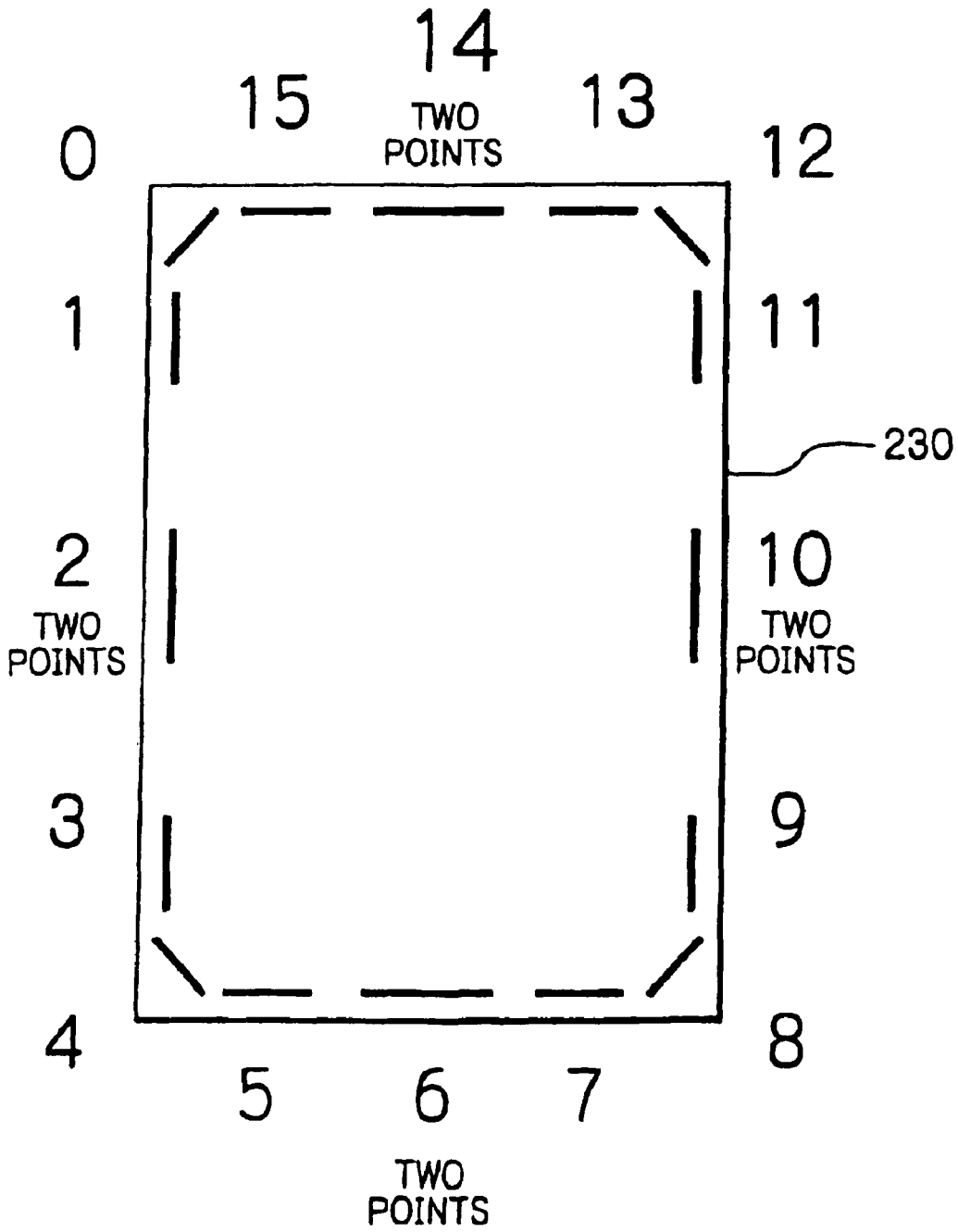
FIG. 4 shows staple patterns and parameters attached thereto.

As shown in FIG. 4, sixteen different stapling patterns are available with the stapler 225. In a pattern 1, 3, 11 or 9, the stapler 225 staples a sheet or print 230 at the top or the bottom of the right edge or the top or the bottom of the left edge. In a pattern 15, 13, 5 or 7, the stapler 225 staples the sheet 230 at one of the right and left points of the top or one of the right and left points at the bottom. In a pattern 0, 4, 8 or 12, the stapler 225 staples the sheet 230 at one of four corners. In a pattern 2, the stapler 225 staples the sheet 230 at two vertically spaced points at the left edge. In a pattern 10, the stapler 225 staples the sheet 230 at two vertically spaced points at the right edge. In a pattern 14, the stapler 225 staples two horizontally spaced points at the top. Further, in a pattern 6, the stapler 225 staples two horizontally spaced points at the bottom. The puncher 224 punches the sheet 230 in the same manner as the stapler 225 staples it at two points at the same time.

FIGS. 5 through 8 are tables listing various combinations each showing whether or not adequate stapling or punching is practicable in relation to a designated printing direction (portrait or landscape), sheet size, and the position of sheets. In FIGS. 5 through 8, the term "cancel" indicates that stapling is canceled because stapling is physically impracticable in a desired direction. "0/180" is indicative of an angle by which the sheet 230 should be rotated for stapling it in a desired direction. The term "duplex cancel" indicates that stapling is canceled because the direction of duplex printing and stapling position are inconsistent. The memory 213 of the printer controller 210 stores parameters relating to patterns, print directions (portrait and landscape), sheet sizes and directions of sheet feed shown in FIGS. 5 through 8 as lookup tables 217a through 217d.

The term "portrait" refers to a direction in which an image, like a portrait, is formed (printed) on a sheet fed in the short edge feed position. The term "landscape" refers to a direction in which an image, like a landscape, is formed (printed) on a sheet fed in the long edge feed position.

Figure 9:
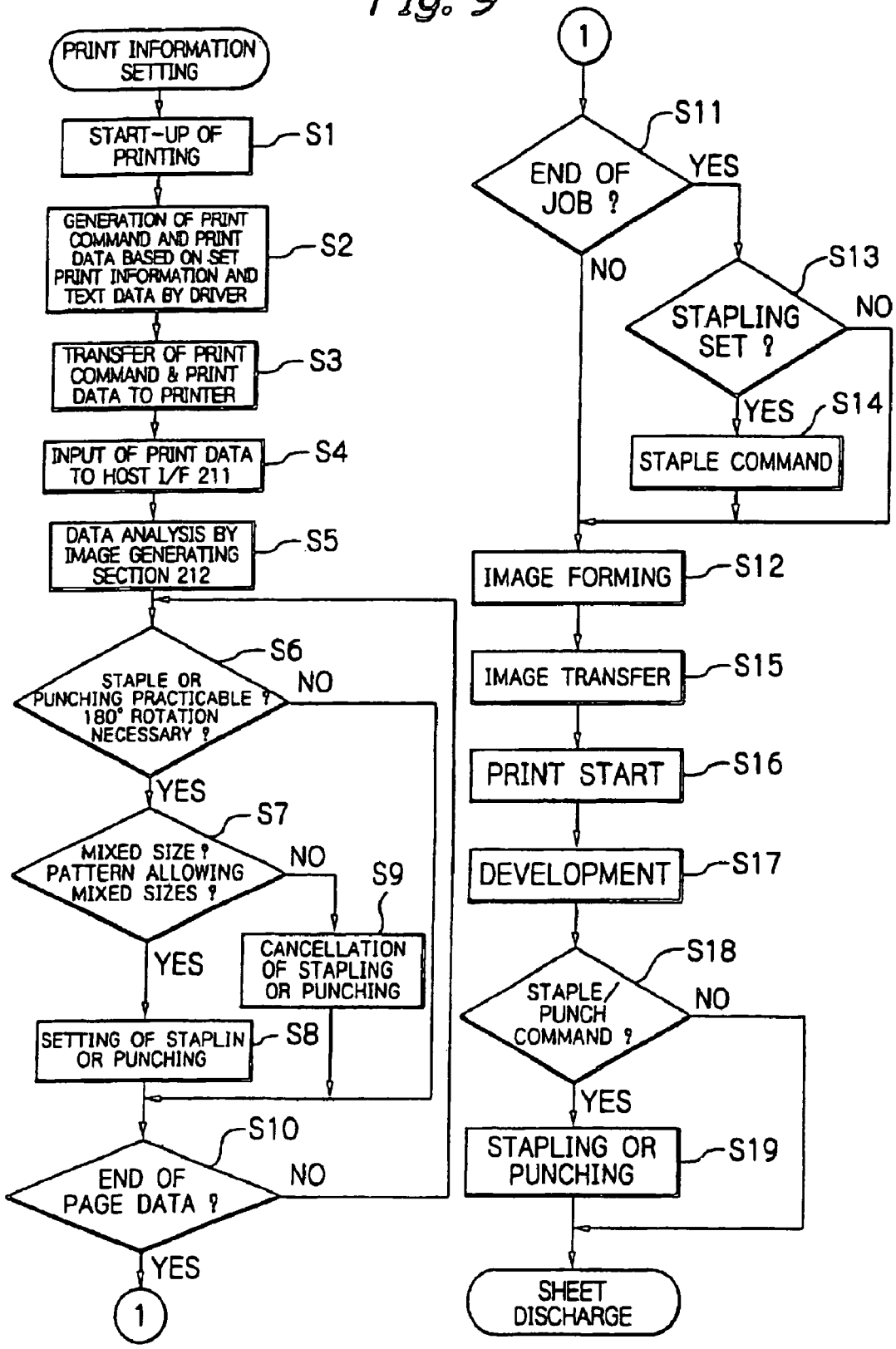
FIG. 9 is a flowchart demonstrating a specific operation of the illustrative embodiment.
Figure 10A:
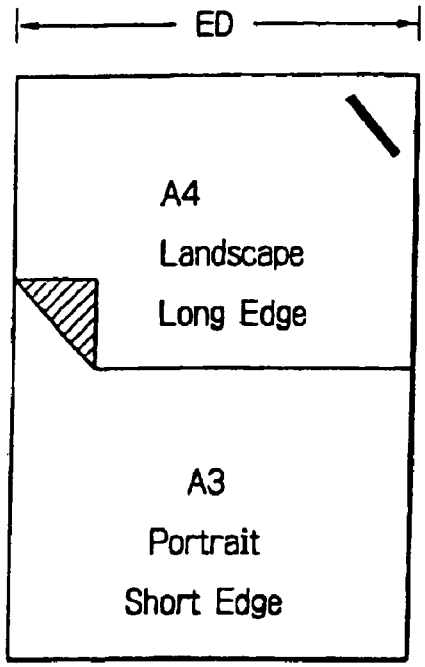
FIG. 10 shows specific combinations of the sizes and positions of sheets that can be stapled in the illustrative embodiment.
Figure 10B:
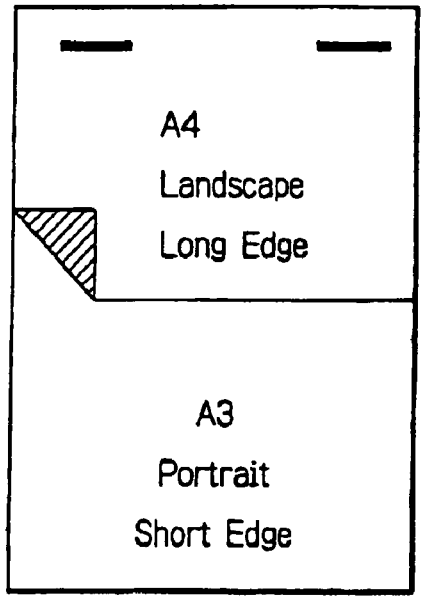
Figure 10C:
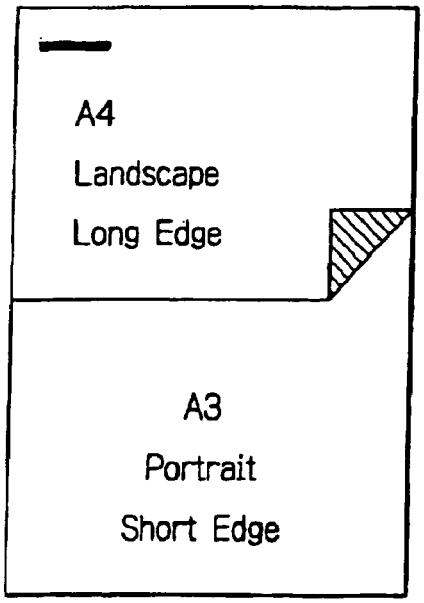
Figure 10D:
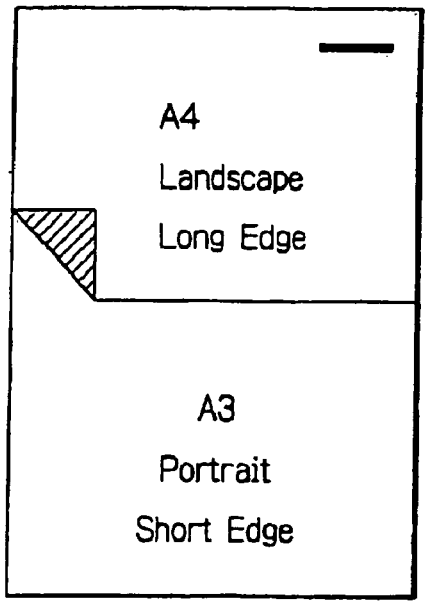

Reference will be made to FIG. 9 for describing how the printer 200 prints data received from the host computer 100. Assume that the operator of the host computer 10 inputs a text or a graphic on the computer 100 and then inputs a print command. Then, a printer driver included in the host computer 100 is started up to set up a print setting condition (step S1). The operator then selects, via an application or the printer driver, printing conditions including a printing direction (portrait or landscape), a sheet size, a stapling or a punching point and a binding direction, which show whether or not a duplex print mode is practicable, as well as finishing conditions. In response, the printer driver generates commands indicative of printing conditions and finishing conditions in accordance with the input information and document data (step S2). The host computer 100 sends the generated print data and commands to the printer 200 via its printer I/F (step S3). The host I/F 211 of the printer 200 delivers the print data and commands received from the host computer 100 to the image generating section 212 (step S4).

In the image generating section 212, the data converter 215 analyzes the print data and then converts them to image data (step S5). At this instant, the numbers assigned to the staple patterns shown in FIG. 4 are used. While the punch patterns are identical with the staple patterns that staple sheets at two points, 0 is assigned to the punch pattern identical with the staple pattern 2 and sequentially incremented as 1, 2 and 3 counterclockwise.

The finishing decider 216 analyzes the input commands and compares the finishing conditions indicated by the commands, e.g., a staple pattern with the various information listed in the lookup tables 217a through 217d, FIGS. 5 through 8, stored in the memory 213. The lookup tables 217a through 217d each list a particular printing direction, sheet sizes, stapling points and patterns thereof, duplex print stapling positions, and information relating to the sheets 230 actually stacked on the trays of the sheet feed sections 222a through 222d. The finishing decider 216 determines whether or not stapling or punching is practicable and whether or not to rotate the sheets by 180°.

Further, the finishing decider 216 determines whether or not a single job, i.e., a group of print data received from the host computer 100 contains a command for printing images on sheets of different sizes (mixed sizes). Also, the finishing decider 216 determines whether or not the sheets with mixed sizes can be finished as a bundle (step S7). If the answer of the step S7 is positive (Yes), the finishing decider 216 sets stapling or punching (step S8). At the same time, the finishing decider 216 commands 180° rotation and duplex print, if necessary, and designates a pattern (mechanically, one of the four patterns shown in FIGS. 5 through 8) as well as whether or not to effect punching. The image generating section 212 executes 180° rotation. If the answer of the step S7 is negative (No), the finishing decider 216 cancels stapling or punching (step S9).

The steps S5 through S9 are repeated up to the last page data (step S10). When the setting procedure ends, electronic images generated by the image generating section 212 are delivered to the image-processing main controller 221 via the printer engine I/F 214 (steps S11, S12 and S15). The main controller 221 causes the plotter 223 to form images in accordance with the image data and print them on sheets, which are sequentially fed from the sheet feed section 222 (steps S16 and S17). As soon as the image data are printed out on all pages (Yes, step S11), the controller 221 determines whether or not stapling or punching should be executed (step S13). If the answer of the step S13 is Yes, then the controller 221 sends a staple command to the sheet discharge section 224 (step S14). In response, the stapler 225 or the puncher 226 staples or punches, respectively, a stack of prints in the set conditions (steps S18 and S19).

The staple setting in the step S8, FIG. 9, will be described more specifically with reference to FIGS. 10A through 10D. As shown, assume the combination of sheets belonging to the same size series, but different in size, and having the same edge length ED. More specifically, assume that the short edges of a sheet of a large size and the long edges of a sheet of a small size have the same edge length ED. For example, assume that such sheets are fed with the short edges of the large size sheet being positioned perpendicularly to the direction of sheet feed (A3 short edge feed) or that they are conveyed with the long edges of the small size sheet being positioned perpendicularly to the above direction (A4 long edge feed). Then, the finishing decider 216 allows the sheets to be stapled together in an A3 portrait short edge and A4 landscape long edge mode if any one of the following stapling conditions are designated: top right, oblique stapling shown in FIG. 10A (staple parameter 12, FIG. 8, A2), top two-point stapling shown in FIG. 10B (staple parameter 14, FIG. 5, B1 and FIG. 8, B2), top left, horizontal stapling shown in FIG. 10C (staple parameter 15, FIG. 5, C1 and FIG. 8, C2), and top right, horizontal stapling shown in FIG. 10D (staple parameter 13, FIG. 5, D1 and FIG. 8, D2).

Figure 11A:
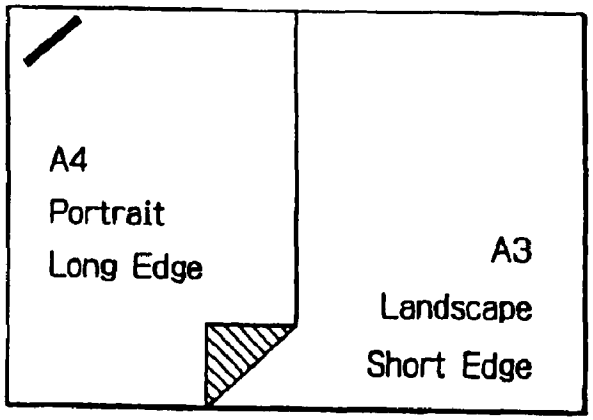
FIGS. 11A through 11C show other specific combinations of the sizes and positions of sheets that can be stapled in the illustrative embodiment.
Figure 11B:
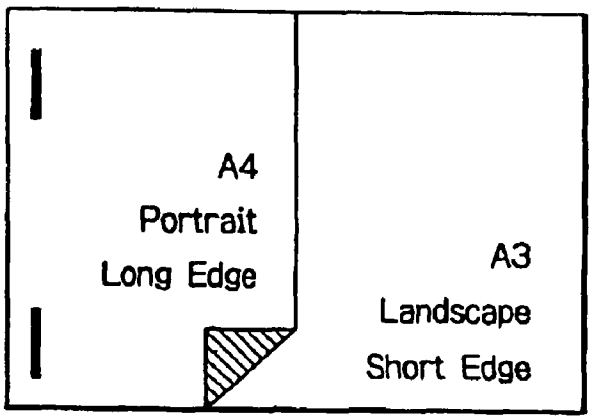
Figure 11C:
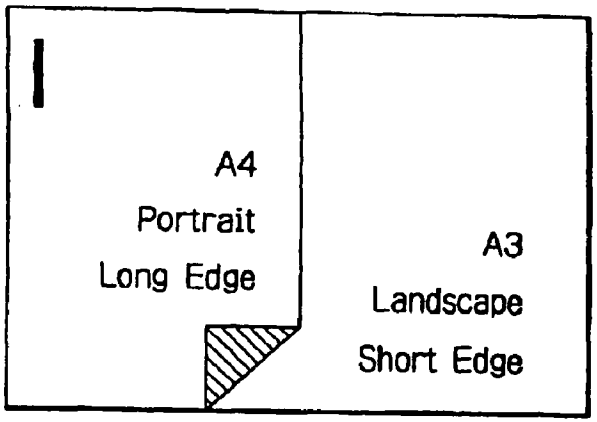

Again, assume that the short edges of a sheet of a large size and the long edges of a sheet of a small size have the same edge length ED. Assume that such sheets are fed with the short edges of the large size sheet being positioned perpendicularly to the direction of sheet feed (A3 short edge feed) or that they are conveyed with the long edges of the small size sheet being positioned perpendicularly to the above direction (A4 long edge feed). Then, the finishing decider 216 allows the sheets to be stapled together in an A3 landscape short edge and A4 portrait long edge mode if any one of the following stapling conditions are designated: top left, oblique stapling shown in FIG. 11A (staple parameter 0, FIG. 6, E1 and FIG. 7, E2), left two-point stapling shown in FIG. 11B (stapl parameter 2, FIG. 6, F1 and FIG. 7, F2), and top left, vertical stapling shown in FIG. 11C (FIG. 6, G1 and FIG. 7, G2).

On the other hand, assume that the short edges of a sheet of a large size and the long edges of a sheet of a small size have the same edge length ED. Assume that such sheets are fed with the short edges of the large size sheet being positioned perpendicularly to the direction of sheet feed (A3 short edge feed) or that they are conveyed with the long edges of the small size sheet being positioned perpendicularly to the above direction (A4 long edge feed). Then, the finishing decider 216 does not allow the sheets to be stapled in the A3 portrait short edge and A4 landscape long edge mode if any one of the following stapling conditions are designated: top left, oblique stapling (staple parameter 0, FIG. 5, H1 and FIG. 8, H1), left two-point stapling (staple parameter 2, FIG. 5, I1 and FIG. 8, I2), and right two-point stapling (parameter 10, FIG. 5, J1 and FIG. 8, J2).

Again, assume that the short edges of a sheet of a large size and the long edges of a sheet of a small size have the same edge length ED. Assume that such sheets are fed with the short edges of the large size sheet being positioned perpendicularly to the direction of sheet feed (A3 short edge feed) or that they are conveyed with the long edges of the small size sheet being positioned perpendicularly to the above direction (A4 long edge feed). Then, the finishing decider 216 does not allow the sheets to be stapled in the A3 landscape short edge and A4 portrait long edge mode if any one of the following stapling conditions are designated: top right, oblique stapling (staple parameter 12, FIG. 6, K1 and FIG. 7, K2), and top two-point stapling (staple parameter 14, FIG. 6, L1 and FIG. 7, L2).

The illustrative embodiment has concentrated on sizes A3 and A4, which are respectively a large size and a small size prescribed by JIS (Japanese Industrial Standards). However, the illustrative embodiment is applicable to all combinations of sheets so long as the short edges of a sheet of a large size and the long edges of a sheet of a small size have the sane length. For example, such a relation holds between sheets belonging to IS B series and between letter size and double letter size.

As stated above, the illustrative embodiment has various unprecedented advantages, as enumerated below.

(1) A stack of sheets is stapled only if all images will appear in the same orientation when the stapled stack is spread. The stack can therefore be stapled in an easy-to-see manner.

(2) As for the combination of small size landscape and large size portrait or the combination of A4 portrait and A3 landscape, a stack of sheets are stapled only if the short edges of a large size sheet and the long edges of a small size sheet have the same length in the direction perpendicular to the direction of sheet feed. This also allows the stack to be stapled in an easy-to-see manner.

(3) Assume that the short edges or a large size sheet and the long edges of a small size sheet have the same length in the direction perpendicular to the direction of sheet feed. Also, assume that top right, oblique stapling, top left horizontal stapling or top right horizontal stapling is designated. Then, as for the combination of A3 portrait and A4 landscape, a sheet stack is allowed to be stapled. The stack can therefore be adequately stapled in an easy-to-see manner.

(4) Assume that the short edges of a large size sheet and the long edges of a small size sheet have the same length in the direction perpendicular to the direction of sheet feed. Also, assume that top left, oblique stapling, left two-point stapling or right two-point stapling is designated. Then, as for the combination of A3 portrait and A4 landscape, a sheet stack is not allowed to be stapled. This successfully obviates inadequate stapling.

(5) Assume that the short edges of a large size sheet and the long edges of a small size sheet have the same length in the direction perpendicular to the direction of sheet feed. Also, assume that top left, oblique stapling, left two-point stapling or top left horizontal stapling is designated. Then, as for the combination of A3 landscape and A4 portrait, a sheet stack is allowed to be stapled. The stack can therefore be adequately stapled in an easy-to-see manner.

(6) Assume that the short edges of a large size sheet and the long edges of a small size sheet have the same length in the direction perpendicular to the direction of sheet feed. Also, assume that top right stapling or two top points stapling is designated. Then, as for the combination of A3 landscape and A4 portrait, a sheet stack is not allowed to be stapled. This successfully obviates inadequate stapling that is physically impracticable.

In the illustrative embodiment, the sheet feed section has a plurality of sheet trays. The image forming means forms images in accordance with image data written to a RAM (Random Access Memory). The stapling means is capable of stapling a stack of sheets in any one of a rear oblique mode, a rear vertical mode, a front mode, and a two-point mode at the trailing edge of the stack. The image forming means additionally has a function of rotating image data by 180° if stapling is allowable.

Figure 12:
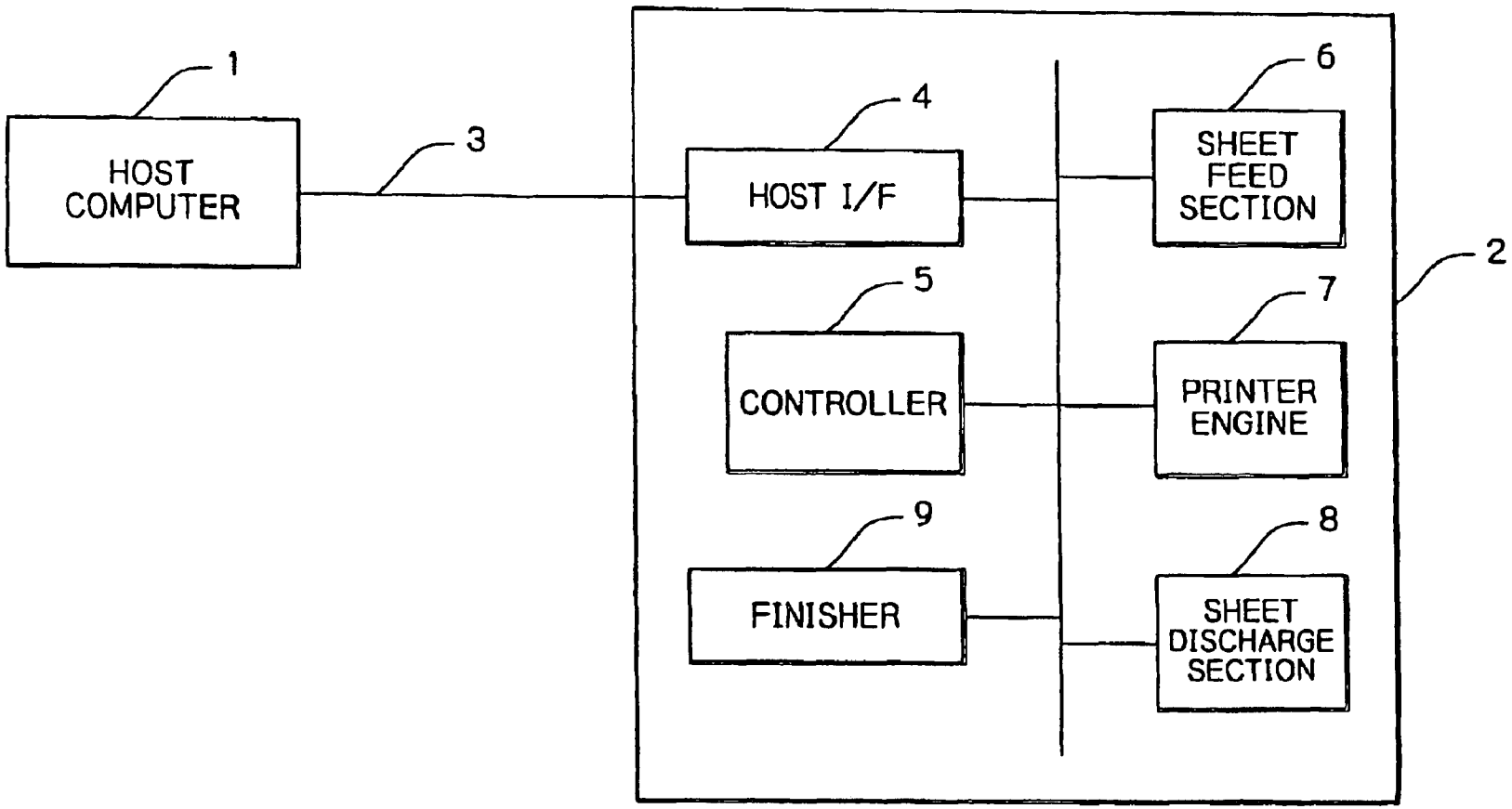
FIG. 12 is a schematic block diagram showing an alternative embodiment of the present invention.

An alternative embodiment of the present invention will be described with reference to FIG. 12. As shown, the image forming system includes a host computer 1, an image forming apparatus 2, and communication means 3 connecting the host computer 1 and image forming apparatus 2. The image forming apparatus 2 is generally made up of a host I/F 4 connected to the host computer 1, a controller 5, a sheet feed section 6, a printer engine 7, a sheet discharge section 8, and a finisher 9 including a stapler. The sheet feed section 6 includes a plurality of stays each being loaded with a stack of sheets of a particular size in a particular orientation. The printer engine 7 prints out print data received from the host computer 1 on the sheets. The sheet discharge section drives the sheets carrying images thereon, i.e., prints out of the apparatus. Generally, the finisher 9 is selectively connected to the sheet discharge section 9 as an option. The illustrative embodiment executes unique control at the time of stapling, so that the finisher 9 with a stapler is essential.

The communication means 3 is implemented as a signal cable or a LAN (Local Area Network) or similar network. The apparatus 1 receives print data and print conditions input on the host computer 1 via the host I/F 4 matching with the communication means 3. Also, the apparatus 1 sends a control signal representative of its status to the host computer 1 via the host I/F 4. It is to be noted that the print conditions include whether or not to execute stapling. Stapling conditions include the point and direction of stapling and the number of stapling points, i.e., one point or two points.

The controller 5 controls the sheet feed section 6, printer engine 7, sheet discharge section 8, and finisher 9. The controller 5 analyzes a control signal and print data received from the host computer 1. The print data usually include a print command and print data. The controller 5 converts the print data to electronic image data. Further, the controller 5 designates sheets to be fed from the sheet feed section 6 and a sheet discharge mode available with the sheet discharge section 8 in accordance with the print conditions. The controller 5 then produces one page of image data and causes the plotter of the printer engine 7 to print it out on a sheet while executing timing control. The sheet with a toner image is driven out via a fixing station and the sheet discharge section 8. The printer engine 7 forms the toner image by using, e.g., an electrophographic process. The controller selects suitable one of the sheet trays of the sheet feed section.

The sheet or print driven out via the sheet discharge section 8 is introduced into the finisher 9. If the print conditions include a staple command, then the sheet is conveyed to a staple tray included in the finisher 9. As soon as a preselected number of sheets are stacked on the staple tray, the stapler staples them together at a designated point or points.

In the illustrative embodiment, the operator of the host computer 1 generates a text or a graphic on the host computer 1 by using an application and then inputs a print command. In response, a printer driver included in the host computer 1 and adaptive to the apparatus 2 is started up to set print conditions. Again, sixteen different stapling patterns shown in FIG. 4 are available with the finisher 9, i.e., the group of patterns 1, 3, 11 and 9, group of patterns 15, 13, 5 and 7, group of patterns 0, 4, 8 and 12, and the patterns 2, 10, 14 and 6.

Figure 13:
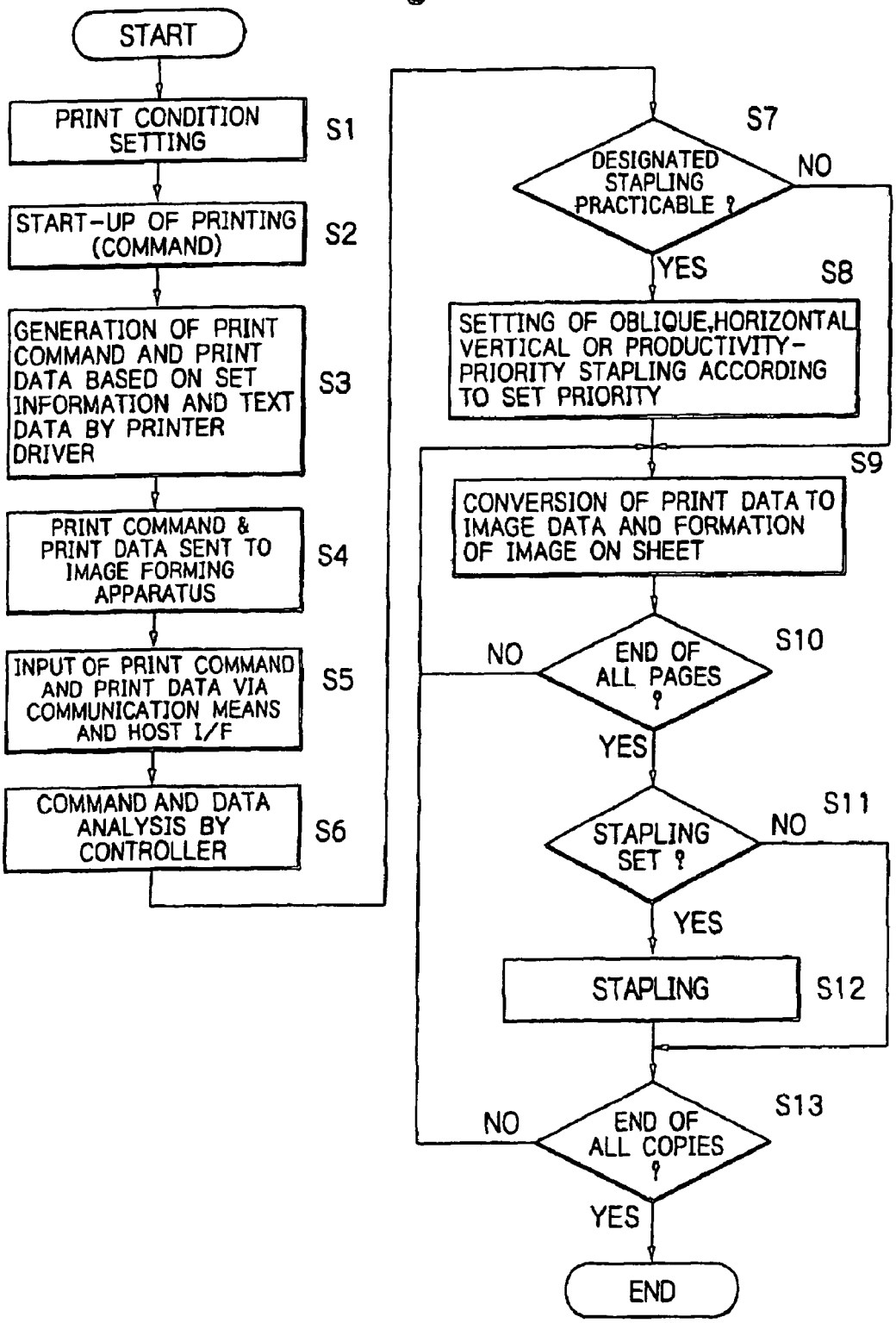
FIG. 13 is a flowchart demonstrating a specific operation of the illustrative embodiment.

Reference will be made to FIG. 13 for describing a specific operation of the illustrative embodiment. A CPU (Central Processing Unit), not shown, included in the controller 5 executes the procedure to be described in accordance with a program stored in a ROM (Read Only Memory) not shown. The CPU uses a RAM, not shown, as a work area.

As shown in FIG. 13, the operator of the host computer 1 inputs desired print data including a printing direction, a sheet size, a stapling point or points (FIG. 4), a stapling pattern and duplex printing (including a stapling direction) via the application or the printer driver (step S1). When the operator inputs a print command (step S2), the printer driver generates a print command and print data based on text data, set information and so forth and matching with the apparatus 2 (step S3). The host computer 1 sends the print command and print data to the apparatus 2 via the communication means 3 (step S4).

The apparatus 2 receives the print command and print data via the host I/F 4 (step S5). The controller 5 analyzes the print command and print data (step S6). At this instant, the controller 5 identifies the number attached to the staple pattern shown in FIG. 4 by way of example. Alternatively, assume that the operator selects desired one of more specific staple patterns shown in FIGS. 14A, 14B, 15A and 15B. Then, the controller 5 determines whether or not the desired stapling conditions are practicable and whether or not an image should be rotated by 180°. For this decision, the controller 5 references the combination of the print conditions, i.e., the printing direction, sheet size, stapling point or points, stapling pattern, duplex printing and binding direction, and sheet sizes available with the trays of the sheet feed section 6.

Specifically, FIG. 14A shows staple patterns available when an image is to be printed on a sheet with the short edges of the sheet being positioned at the top and bottom (portrait printing) and when the sheet is to be positioned with its long edges extending in parallel to the direction of sheet feed. FIG. 14B shows staple patterns available when portrait printing is to be effected and when the sheet is to be positioned with its long edges extending perpendicularly to the direction of sheet feed. FIG. 15A shows staple patterns available when an image is to be printed on a sheet with the longer edges of the sheet being positioned at the top and bottom (landscape printing) and when the sheet is to be positioned with its long edges extending perpendicularly to the direction of sheet feed. FIG. 15B shows staple patterns available when portrait printing is to be effected and when the sheet is to be positioned with its long edges extending in parallel to the direction of sheet feed.

In FIGS. 14A, 14B, 15A and 15B, the term "cancel" means that stapling is canceled because stapling at a desired staple position is physically impracticable. "0/180" shows an angle by which the controller 5 rotates an image to implement a desired stapling position. The term "duplex cancel" means that stapling is canceled because the direction of duplex printing and staple position are inconsistent.

Referring again to FIG. 13, after the step S6, the controller 5 determines whether or not stapling is practicable with the print command and print data on the basis of the conditions shown in FIGS. 14A through 15B (step S7). If the answer of the step S7 is Yes, then the controller 5 searches for one of the trays loaded with sheets to be subjected to horizontal stapling, vertical stapling, productivity-priority stapling or the like and designates the tray (step S8).

Assume that none of the precise staple patterns shown in FIGS. 14A through 15B is selected. Then, the controller 5 selects one of the trays of the sheet feed section 6 in accordance with the print condition designating part of horizontal stapling, vertical stapling, productivity-priority stapling and so forth. Also, the controller 5 indicates the finisher 9 a stapling point or points and a stapling pattern (mechanically, stapling at one corner of a sheet obliquely, horizontally or vertically or stapling it at two points at one edge). Further, the controller 5 indicates the plotter duplex printing. In addition, the controller 5 indicates the printer engine 7 that an image should be rotated by 180°, if necessary, i.e., on the basis of the stapling direction and the orientation of an image on a sheet.

The productivity-priority stapling will be described specifically hereinafter. The distance over which a sheet should be conveyed for image formation is shortest when the sheet is positioned such that its short edges are parallel to the direction of sheet feed, i.e., its long edges are perpendicular to the above direction. In light of this, when priority is given to productivity, an image is formed on a sheet positioned in such orientation. As far as a relation between the image forming distance and the sheet conveying distance is concerned, the above orientation of a sheet successfully reduces a processing time at least by a difference in length between the short edges and the long edges for a single sheet, compared to the other orientation.

The stapler is held in its home position when stapling is not necessary or moved from the home position to a stapling position when it is necessary. The interval between the start and the end of stapling depends on the distance of movement, the number of stapling points, and whether or not rotation is effected. Therefore, when priority is given to productivity, a sheet and a stapling point are selected by taking account of the orientation during conveyance and staple processing.

After the step S7, if priority is given to oblique stapling, then the controller 5 searches for a tray matching with the staple processing in the following priority order (1) through (4):

(1) oblique stapling and long edge feed
(2) oblique stapling and short edge feed
(3) horizontal or vertical stapling and long edge feed
(4) horizontal or vertical stapling and short edge feed When priority is given to horizontal or vertical stapling, the controller 5 executes the search in the following priority order (1) through (4):

(1) horizontal or vertical stapling and long edge feed
(2) horizontal or vertical stapling and short edge feed
(3) oblique stapling and long edge feed
(4) oblique stapling and short edge feed Further, when priority is given to productivity, the controller 5 executes the search in the following priority order (1) and (2):

(1) oblique stapling and long edge feed
(2) horizontal or vertical stapling and long edge feed In any case, the controller 5 executes selection giving priority to productivity by taking account of the movement of the stapler and image forming time. While priority is given to the stapling condition and sheet orientation matching with the print data received from the host computer 1, productivity-priority processing should preferably be selected as a default mode.

If the answer of the step S7 is No, then the controller 5 executes a step S9. In the step S9, in the case of electrophotographic image formation, the plotter forms a latent image on a photoconductive element with a laser beam in accordance with the image data read out of a memory, which is included in the controller 5. A developing device deposits toner on the latent image. The resulting toner image is transferred to a sheet and then fixed an the sheet at a fixing station.

The sheet discharge section 8 conveys the sheet or print to the staple tray included in the finisher 9. Subsequently, the controller 5 determines whether or not all pages have been printed in accordance with the received print data (step S10). If the answer of the step S10 is No, then the controller 5 again executes the step S9. If the answer of the step S10 is Yes, then the controller 5 determines whether or not the previously stated staple setting is present (step S11). If the answer of the step S11 is Yes, then the controller 5 causes the stapler to staple a stack of sheets on the staple tray at the preselected point or points (step S12). If the answer of the step S12 is Yes or if the answer of the step S11 is No, then the controller 5 determines whether or not a desired number of sheet stacks (copies) have been fully stapled (step S13). If the answer of the step S13 is No, then the procedure returns to the step S9; if otherwise, the procedure ends.

In the illustrative embodiment, after images have been printed on all pages of a single copy, the copy is stapled, as stated above. Alternatively, all copies may be output and then stapled one by one, in which case sheets will be fed from a plurality of trays.

As stated above, the controller 5 determines whether or not stapling is practicable in accordance with print conditions and then selects a stapling position in accordance with a preselected priority order. This allows practicable setting to be easily selected.

Various modifications will become possible for those skilled in the art after receiving the teachings of the present disclosure without departing from the scope thereof.

What is claimed is:

1. A method of stapling sheets each carrying an image formed by an image forming apparatus, comprising the steps of:

designating a stapling operation for a stack of sheets, said stack of sheets including sheets of different sizes mixed together; and stapling the stack of sheets only when each short edge of a large size sheet and each long edge of a small size sheet are identical in length in a direction perpendicular to a direction of sheet feed and when all the images formed on the stack of sheets have the same orientation [when said stack is spread] after stapling.

2. A method of stapling sheets each carrying an image formed by an image forming apparatus, comprising the steps of:

designating a stapling operation for a stack of sheets, said stack of sheets including sheets of different sizes mixed together; and stapling the stack of sheets at one of a position located at a top left of the sheets [in a direction] *with respect to an orientation* of a formed image, a position located at a top right of the sheets [in a direction] *with respect to an orientation* of a formed image, and positions located at a top edge of the sheets [in a direction] *with respect to an orientation* of a formed image, when each short edge of a large size sheet which has a portrait image and each long edge of a small size sheet which has a landscape image are identical in length in a direction perpendicular to a direction of sheet feed.

3. A method of stapling sheets each carrying an image formed by an image forming apparatus, comprising the steps of:

designating a stapling operation for a stack of sheets, said stack of sheets including sheets of different sizes mixed together; and stapling the stack of sheets at one of a position located at a left top of the sheets [in a direction] *with respect to an orientation* of a formed image and positions located at *a* left edge of the sheets [in a direction] *with respect to an orientation* of a formed image, when each short edge of a large size sheet which has a landscape image and each long edge of a small size sheet which has a portrait image are identical in length in a direction perpendicular to a direction of sheet feed.

4. An image forming apparatus, comprising:

an image forming unit configured to form an image on a sheet in accordance with image data and print conditions;

a sheet feeding unit configured to feed a plurality of sheets to said image forming unit;

a sheet discharging unit configured to discharge the sheets coming out of said image forming unit;

a stapling unit configured to staple the sheets stacked; and a control unit configured to control said sheet feeding unit to selectively feed pages with different orientations for printing and *combined* stapling[together].

5. An image forming apparatus, comprising:

an image forming unit configured to form an image on a sheet in accordance with image data and print conditions;

a sheet feeding unit configured to feed a plurality of sheets to said image forming unit;

a sheet discharging unit configured to discharge the sheets coming out of said image forming unit;

a finishing unit configured to finish the sheets stacked; and a control unit configured to control said sheet feeding unit to selectively feed pages with different orientations for printing and *combined* finishing[together].

*6. An image forming apparatus, comprising:*

*a controller configured designate a stapling operation for a stack of sheets, said stack of sheets including sheets of different sizes mixed together; and*

*a stapler configured to staple the stack of sheets only when each short edge of a large size sheet and each long edge of a small size sheet are identical in length in a direction perpendicular to a direction of sheet feed and when all the images formed on the stack of sheets have the same orientation after stapling.*

*7. An image forming apparatus, comprising:*

*means for designating a stapling operation for a stack of sheets, said stack of sheets including sheets of different sizes mixed together; and*

*means for stapling the stack of sheets only when each short edge of a large size sheet and each long edge of a small size sheet are identical in length in a direction perpendicular to a direction of sheet feed and when all the images formed on the stack of sheets have the same orientation after stapling.*

*8. An image forming apparatus, comprising:*

*a controller configured to designate a stapling operation for a stack of sheets, said stack of sheets including sheets of different sizes mixed together; and*

*a stapler configured to staple the stack of sheets at one of a position located at a top left of the sheets with respect to an orientation of a formed image, a position located at a top right of the sheets with respect to an orientation of a formed image, and positions located at a top edge of the sheets with respect to an orientation of a formed image, when each short edge of a large size sheet which has a portrait image and each long edge of a small size sheet which has a landscape image are identical in length in a direction perpendicular to a direction of sheet feed.*

*9. An image forming apparatus, comprising:*

*means for designating a stapling operation for a stack of sheets, said stack of sheets including sheets of different sizes mixed together; and*

*means for stapling the stack of sheets at one of a position located at a top left of the sheets with respect to an orientation of a formed image, a position located at a top right of the sheets with respect to an orientation of a formed image, and positions located at a top edge of the sheets with respect to an orientation of a formed image, when each short edge of a large size sheet which has a portrait image and each long edge of a small size sheet which has a landscape image are identical in length in a direction perpendicular to a direction of sheet feed.*

*10. An image forming apparatus, comprising:*

*a controller configured to designate a stapling operation for a stack of sheets, said stack of sheets including sheets of different sizes mixed together; and*

*a stapler configured to staple the stack of sheets at one of a position located at a left top of the sheets with respect to an orientation of a formed image and positions located at a left edge of the sheets with respect to an orientation of a formed image, when each short edge of a large size sheet which has a landscape image and each long edge of a small size sheet which has a portrait image are identical in length in a direction perpendicular to a direction of sheet feed.*

*11. An image forming apparatus, comprising:*

*means for designating a stapling operation for a stack of sheets, said stack of sheets including sheets of different sizes mixed together; and*

*means for stapling the stack of sheets at one of a position located at a left top of the sheets with respect to an orientation of a formed image and positions located at a left edge of the sheets with respect to an orientation of a formed image, when each short edge of a large size sheet which has a landscape image and each long edge of a small size sheet which has a portrait image are identical in length in a direction perpendicular to a direction of sheet feed.*

*12. A method of stapling sheets each carrying an image formed by an image forming apparatus, comprising the steps of:*

*forming an image on a sheet in accordance with image data and print conditions;*

*feeding a plurality of sheets to said image forming unit;*

*discharging the sheets coming out of said image forming unit;*

*stapling the sheets stacked; and*

*controlling said sheet feeding unit to selectively feed pages with different orientations for printing and combined stapling.*

*13. An image forming apparatus, comprising:*

*means for forming an image on a sheet in accordance with image data and print conditions;*

*means for feeding a plurality of sheets to said image forming unit;*

*means for discharging the sheets coming out of said image forming unit;*

*means for stapling the sheets stacked; and*

*means for controlling said sheet feeding unit to selectively feed pages with different orientations for printing and combined stapling.*

*14. A method of stapling sheets each carrying an image formed by an image forming apparatus, comprising the steps of:*

*feeding a plurality of sheets;*

*forming an image on a sheet in accordance with image data and print conditions;*

*stacking discharged sheets; and*

*finishing the stacked sheets; and*

*controlling said step of feeding to selectively feed pages with different orientations for printing and combined finishing.*

*15. An image forming apparatus, comprising:*

*means for feeding a plurality of sheets;*

*means for forming an image on a sheet in accordance with image data and print conditions;*

*means for stacking discharged sheets; and*

*means for finishing the stacked sheets; and*

*means for controlling said step of feeding to selectively feed pages with different orientations for printing and combined finishing.*

*16. A method of stapling sheets each carrying an image formed by an image forming apparatus, comprising the steps of:*

*receiving print data and a command from a host device;*

*designating a stapling operation for a stack of sheets, said stack of sheets including sheets of different sizes mixed together; and*

*stapling the stack of sheets when each short edge of a large size sheet and each long edge of a small size sheet are identical in length in a direction perpendicular to a direction of sheet feed.*

*17. The method of claim 16, wherein said step of stapling comprises:*

*stapling the stack of sheets when images formed on the stack of sheets have a same orientation relative to a sheet output direction.*

*18. The method of claim 16, wherein said step of stapling comprises:*

*stapling the stack of sheets at one of a position located at a top left of the sheets with respect to an orientation of a formed image, a position located at a top right of the sheets with respect to an orientation of a formed image, and a position located at a top edge of the sheets with respect to an orientation of a formed image.*

*19. The method of claim 16, wherein said step of stapling comprises:*

*stapling when each short edge of a large size sheet which has a portrait image and each long edge of a small size sheet which has a landscape image are identical in length in a direction perpendicular to a direction of sheet feed.*

*20. The method of claim 16, wherein said step of stapling comprises:*

*stapling the stack of sheets at one of a position located at a left top of the sheets with respect to an orientation of a formed image and a position located at left edge of the sheets with respect to an orientation of a formed image.*

*21. The method of claim 16, wherein said step of stapling comprises:*

*stapling when each short edge of a large size sheet which has a landscape image and each long edge of a small size sheet which has a portrait image are identical in length in a direction perpendicular to a direction of sheet feed.*

*22. The method of claim 16, wherein said host device comprises:*

*a host computer.*

*23. The method of claim 16, wherein said host device comprises:*

*a scanner.*

*24. An image forming apparatus, comprising:*

*an input/output port configured to receive print data and a command from a host device;*

*a controller configured to designate a stapling operation for a stack of sheets, said stack of sheets including sheets of different sizes mixed together; and*

*a stapler configured to staple the stack of sheets when each short edge of a large size sheet and each long edge of a small size sheet are identical in length in a direction perpendicular to a direction of sheet feed.*

*25. The apparatus of claim 24, wherein said stapler is configured to staple the stack of sheets when images formed on the stack of sheets have a same orientation relative to a sheet output direction.*

*26. The apparatus of claim 24, wherein said stapler is configured to staple the stack the stack of sheets at one of a position located at a top left of the sheets with respect to an orientation of a formed image, a position located at a top*

*right of the sheets with respect to an orientation of a formed image, and a position located at a top edge of the sheets with respect to an orientation of a formed image.*

*27. The apparatus of claim 24, wherein said stapler is configured to staple the stack when each short edge of a large size sheet which has a portrait image and each long edge of a small size sheet which has a landscape image are identical in length in a direction perpendicular to a direction of sheet feed.*

*28. The apparatus of claim 24, wherein said stapler is configured to staple the stack the stack of sheets at one of a position located at a left top of the sheets with respect to an orientation of a formed image and a position located at left edge of the sheets with respect to an orientation of a formed image.*

*29. The apparatus of claim 24, wherein said stapler is configured to staple the stack when each short edge of a large size sheet which has a landscape image and each long edge of a small size sheet which has a portrait image are identical in length in a direction perpendicular to a direction of sheet feed.*

*30. The apparatus of claim 24, wherein said host device comprises:*

*a host computer.*

*31. The apparatus of claim 24, wherein said host device comprises:*

*a scanner.*

*32. An image forming apparatus, comprising:*

*means for receiving print data and a command from a host device;*

*means for designating a stapling operation for a stack of sheets, said stack of sheets including sheets of different sizes mixed together; and*

*means for stapling the stack of sheets when each short edge of a large size sheet and each long edge of a small size sheet are identical in length in a direction perpendicular to a direction of sheet feed.*

*33. The image forming apparatus of claim 32, wherein said means for stapling comprises:*

*means for stapling the stack of sheets when images formed on the stack of sheets have a same orientation relative to a sheet output direction.*

*34. The image forming apparatus of claim 32, wherein said means for stapling comprises:*

*means for stapling the stack of sheets at one of a position located at a top left of the sheets with respect to an orientation of a formed image, a position located at a top right of the sheets with respect to an orientation of a formed image, and a position located at a top edge of the sheets with respect to an orientation of a formed image.*

*35. The image forming apparatus of claim 32, wherein said means for stapling comprises:*

*means for stapling when each short edge of a large size sheet which has a portrait image and each long edge of a small size sheet which has a landscape image are identical in length in a direction perpendicular to a direction of sheet feed.*

*36. The image forming apparatus of claim 32, wherein said means for stapling comprises:*

*means for stapling the stack of sheets at one of a position located at a left top of the sheets with respect to an orientation of a formed image and a position located at left edge of the sheets in a direction of a formed image.*

*37. The image forming apparatus of claim 32, wherein said means for stapling comprises:*

*means for stapling when each short edge of a large size sheet which has a landscape image and each long edge of a small size sheet which has a portrait image are identical in length in a direction perpendicular to a direction of sheet feed.*

*38. The apparatus of claim 32, wherein said host device comprises:*

*a host computer.*

*39. The apparatus of claim 32, wherein said host device comprises:*

*a scanner.*

*40. An image forming apparatus configured to form an image, comprising:*

*a stapler;*

*a selection receiving unit configured to receive a selection of a stapling position and an image orientation for at least one sheet;*

*a short edge feed tray configured to hold the at least one sheet and to feed said at least one sheet in a direction perpendicular to a short edge direction of the sheet;*

*a long edge feed tray configured to hold at least one other sheet and to feed said at least one sheet in a direction perpendicular to a long edge direction of the sheet;*

*a sheet feeding unit configured to a controllably draw a sheet from one of said short edge feed tray and said long edge feed tray such that pages with different orientations are fed for image forming and stapling together; and*

*a control unit configured to control said sheet feeding unit to select one of said short edge feed tray and said long edge feed tray to draw from based on the selected stapling position and the selected image orientation of said sheet.*

*41. The image forming apparatus as claimed in claim 40, further comprising:*

*a controllable stapling unit configured to staple a plurality of sheets drawn from one or more of said short edge feed tray and said long edge feed tray, wherein*

*said controller is further configured to control said controllable stapling unit.*

*42. The image forming apparatus as claimed in claim 40, wherein said control unit is configured to control said sheet feeding unit in accordance with a stapling process time and an image formation time.*

*43. The image forming apparatus as claimed in claim 42, wherein said control unit is configured to control said sheet feeding unit so that said long edge feed tray is preferably selected when priority is given to productivity.*

*44. The image forming apparatus as claimed in claim 40, wherein said selected stapling position comprises one of:*

*a horizontal position and a vertical position relative to said selected image orientation.*

*45. The image forming apparatus as claimed in claim 44, wherein said the control unit selects said orthogonal position when priority is given to productivity.*

*46. The image forming apparatus as claimed in claim 40, further comprising:*

*an input device configured to allow a user to input one of said selected stapling position and said selected image orientation.*

*47. The image forming apparatus as claimed in claim 43, wherein said control unit is configured to control a controllable stapling unit and said sheet feeding unit according to one of two modes of operation, said two modes of operation including*

*oblique stapling of long edge fed sheets, and*

*horizontal or vertical stapling of long edge fed sheets.*

*48. A method of forming an image in an image forming apparatus, comprising:*

*receiving a selection of a stapling position and a selected image orientation of at least one sheet;*

*holding the at least one sheet in a short edge feed tray configured to feed said at least one sheet in a direction perpendicular to a short edge direction of the sheet;*

*holding at least one other sheet in a long edge feed tray configured to feed said at least one sheet in a direction perpendicular to a long edge direction of the sheet;*

*controllably selecting one of said short edge feed tray and said long edge feed tray to draw a sheet from based on the selected stapling position and the selected image orientation of said sheet such that pages with different orientations are fed for image forming and stapling together.*

*49. The method of claim 48, further comprising:*

*controllably stapling a plurality of sheets drawn from one or more of said short edge feed tray and said long edge feed tray.*

*50. The method of claim 48, wherein said step of controllably drawing includes drawing said sheet in accordance with a stapling process time and an image formation time.*

*51. The method of claim 50, wherein said step of controllably drawing includes preferably drawing from said long edge feed tray when priority is given to productivity.*

*52. The method of claim 48, wherein said selected stapling position comprises one of:*

*a horizontal position and a vertical position relative to said selected image orientation.*

*53. The method of claim 52, further comprising:*

*selecting said orthogonal position when priority is given to productivity.*

*54. The method of claim 48, further comprising:*

*inputting one of said selected stapling position and said selected image orientation via an input device.*

*55. The method of claim 51, wherein said step of controllably drawing comprises:*

*controllably drawing according to one of two modes of operation, said two modes of operation including oblique stapling of long edge fed sheets, and horizontal or vertical stapling of long edge fed sheets.*

*56. An image forming apparatus, comprising:*

*means for holding at least one sheet in a short edge feed tray configured to feed said at least one sheet in a direction perpendicular to a short edge direction of the sheet;*

*means for holding at least one other sheet in a long edge feed tray configured to feed said at least one sheet in a direction perpendicular to a long edge direction of the sheet;*

*means for controllably selecting one of said short edge feed tray and said long edge feed tray to draw a sheet from based on the selected stapling position and the selected image orientation of said sheet such that pages with different orientations are fed for image forming and stapling together.*

* * * * *